(No Model.)

J. L. BAY.
NUT LOCK.

No. 402,054. Patented Apr. 23, 1889.

WITNESSES,
T. Walter Fowler,
J. Edward Fowler,

INVENTOR,
Joseph L. Bay,
by A. H. Evans & Co.
Attorneys.

UNITED STATES PATENT OFFICE.

JOSEPH L. BAY, OF LITTLE ROCK, ARKANSAS.

NUT-LOCK.

SPECIFICATION forming part of Letters Patent No. 402,054, dated April 23, 1889.

Application filed February 14, 1889. Serial No. 299,904. (No model.)

*To all whom it may concern:*

Be it known that I, JOSEPH L. BAY, a citizen of the United States, residing at Little Rock, in the county of Pulaski and State of Arkansas, have invented certain new and useful Improvements in Nut-Locks, of which the following is a clear, full, and exact description, reference being had to the accompanying drawings making a part of this specification, in which—

Figure 1:
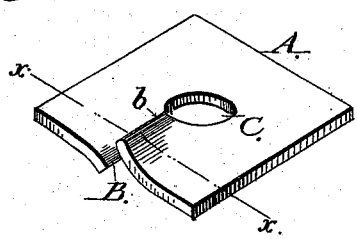
Figure 3:
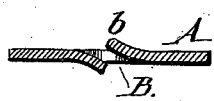
Figure 2:
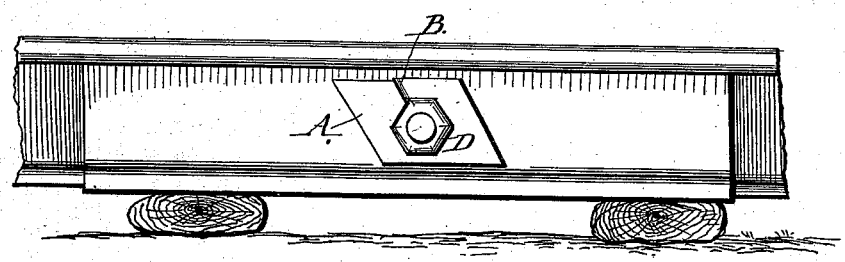
Figure 4:
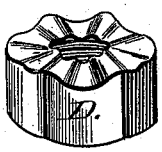
Figure 5:

Figure 1 represents a perspective view of my improvement with the slit running from the bolt-hole to one side of the washer. Fig. 2 is a side elevation of a railroad-joint with my improvement applied thereto. Fig. 3 is a section through the line X X of Fig. 1. Fig. 4 is a perspective view of the inner face of the nut. Fig. 5 is a side elevation of the nut.

My invention relates to an improved nut-lock which is cheap and simple, and which may be readily adjusted with a common wrench; and it consists in the constructions and combinations of devices, which I shall hereinafter fully describe and claim.

In the drawings, A represents my improved washer, which may be cut in a diamond or other desired shape. The slit B, which is a common feature in washers, extends from the bolt-hole to the edge of the washer, as shown in Fig. 1. This washer is made of tempered steel, and has a central hole, C, for the bolt. The sides of the slit are slightly bent in opposite directions and in curved lines extending from points near the outer edge to the slit, so as to form pawl $b$, which pawl I round, for a purpose hereinafter explained. The other bent portion is not rounded, but presents a square edge, which bites into the fish-plate when the washer is applied and prevents the latter from turning.

The engaging-face of the nut D is formed with curved indentations, as shown in Figs. 4 and 5, which indentations engage the pawl $b$. The nut is screwed on the bolt and rides forward on the thread until it engages the projecting lip of the pawl $b$, when the curved indentations will readily allow the nut to pass over the rounded lip of the pawl and bear down the washer to the desired position.

From this description of my improved washer it is evident that with a common wrench the nut may be adjusted, loosened, or removed from the bolt without the use of pinchers or other tools.

Having thus described my invention, what I claim as new, and desire to secure by Letters Patent, is—

An improved nut-lock consisting of a bolt, a washer split from its bolt-hole to one side and having the split portions curved in opposite directions from points near the outer edge to the slit, one of said parts being rounded on its edge to form a pawl and the other portion having a squared edge, and a nut having its face formed with curved depressions, as shown, to engage the rounded edge of the split portion of the washer, as herein described.

JOSEPH L. BAY.

Witnesses:
T. WALTER FOWLER,
J. EDWARD FOWLER.